(12) United States Patent
Delmas et al.

(10) Patent No.: US 6,532,723 B2
(45) Date of Patent: Mar. 18, 2003

(54) AGRICULTURAL IMPLEMENT CONSTRUCTED FOR BEING NARROWED FOR TRANSPORT

(75) Inventors: Jean Delmas, Valay (FR); David Demesmay, Besancon (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/877,965

(22) Filed: Jun. 8, 2001

(65) Prior Publication Data

US 2001/0052226 A1 Dec. 20, 2001

(30) Foreign Application Priority Data

Jun. 20, 2000 (DE) .......................... 100 30 255

(51) Int. Cl.[7] .................. A01D 34/03; A01D 34/43; A01D 34/64
(52) U.S. Cl. .......................... 56/14.7; 56/16.3
(58) Field of Search .................. 56/14.7, 377, 370, 56/396, 399, 16.3, 320.1, 13.5

(56) References Cited

U.S. PATENT DOCUMENTS

| | | | | |
|---|---|---|---|---|
| 3,729,907 A | * | 5/1973 | Burrough et al. ............ 56/14.1 |
| 3,751,889 A | * | 8/1973 | Overesch ................... 56/13.6 |
| 3,962,854 A | * | 6/1976 | Van Der Lely et al. ....... 56/370 |
| 4,215,526 A | * | 8/1980 | Van Der Lely ............. 56/12.7 |
| 4,499,711 A | * | 2/1985 | McLean .................... 56/13.6 |
| 5,203,150 A | * | 4/1993 | Ryken et al. ............... 56/16.3 |
| 5,274,990 A | | 1/1994 | Aron et al. ................. 56/377 |
| 5,953,893 A | * | 9/1999 | Smith et al. .............. 56/320.1 |

FOREIGN PATENT DOCUMENTS

| | | |
|---|---|---|
| DE | 42 15 599 | 11/1993 |
| EP | 0 108 727 | 5/1984 |
| EP | 0 553 506 | 8/1993 |
| EP | 0 823 985 | 2/1998 |

OTHER PUBLICATIONS

Krone Grossflachenmahwerke TM 4/270 und TM 4/330, Druckvermerk 565–7–3.72, no Date, 2 pages.
Kverneland Taarup 4024, 4028, 4032, 4036, 13269, 1099 Norgard Mikkelsen A/S, Nov. 1999, 8 pages.

* cited by examiner

Primary Examiner—Robert E. Pezzuto
Assistant Examiner—Árpád Fábián Kovács

(57) ABSTRACT

An agricultural implement includes a main body which includes the primary components for harvesting and processing crop material and to which peripheral components are attached along respective interfaces which are within or at dimensions corresponding the maximum allowable legal dimension of the implement for transport over public roads. The peripheral components may be hinged or removed at the interfaces so as to narrow the implement either for transport with its length transverse to the direction of travel or for endwise transport.

7 Claims, 2 Drawing Sheets

US 6,532,723 B2

AGRICULTURAL IMPLEMENT CONSTRUCTED FOR BEING NARROWED FOR TRANSPORT

FIELD OF THE INVENTION

The invention refers to an agricultural apparatus featuring a transport device for transport in endwise or longitudinal, and transverse or cross wise positions.

BACKGROUND OF THE INVENTION

Agricultural machines come in ever increasing dimensions, while the legally permitted width of 3 meters for pulled machinery has remained unchanged. Inside Germany, longitudinal transport on a trailer behind a tractor is permitted only for equipment not exceeding a width of 2.55 meters.

The prospectus "KRONE large area mowers TM 4/270 and TM 4/330, imprint 565-7-3.72" shows an agricultural mower-conditioner with a laterally hinged hitch and a chassis with horizontally swiveling wheels, jointly permitting the mower-conditioner to be transported both in a staggered and also in a transverse position behind an agricultural tractor. In order to stay within dimensional limits imposed on public roads, an ejection chute is folded upward.

The prospectus "Kverneland Taarup, 4024/4028/4032/4036/13269/1099 Norgard Mikkelsen A/S" also shows a pulled mower/conditioner. It features lateral guards which, during transport on the road, are folded upward in order to stay within the limit of permitted width for road transport.

The invention provides a simple method of construction so that the transport width of implements is not exceeded.

SUMMARY OF THE INVENTION

According to the present invention there is provided an implement construction that permits the implement to be transported either cross wise or endwise without exceeding the legal limits for transport over public roads.

An object of the invention is to provide a relatively simple construction method for resulting in an implement that can be easily folded or disassembled for legal transport.

A more specific object of the invention is to construct an implement by superimposing a grid on the dimensions of the apparatus in plan view, showing the maximum extension and therewith the farthest possible extension of the interface areas, whereby interface lines can be drawn following the grid or staying with the limits which it maximally permits and to then position the interface areas in the connecting areas of simple attachments like outer dividers, dispersion plates, guards etc.

These and other objects will become apparent from a reading of the ensuing description together with the appended drawings.

DESCRIPTION OF THE PREFERRED EMBODIMENT

Figure 1:
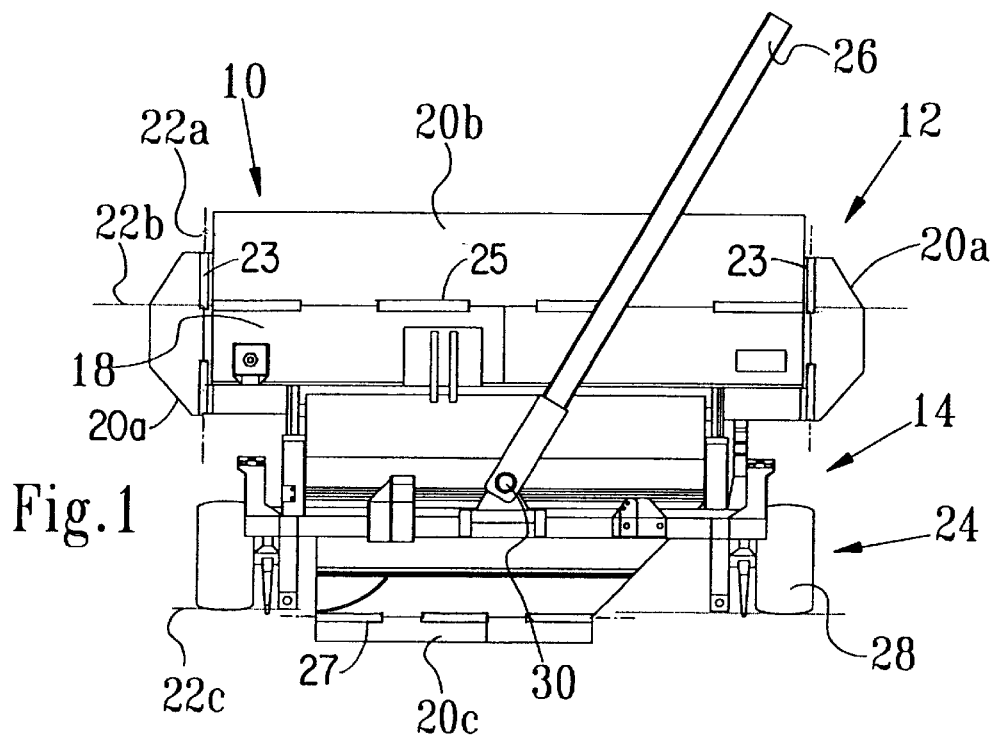
FIG. 1 is a top plan view of a center pivot, mower-conditioner arranged in a working condition wherein it extends transversely to the normal direction of travel.
Figure 2:
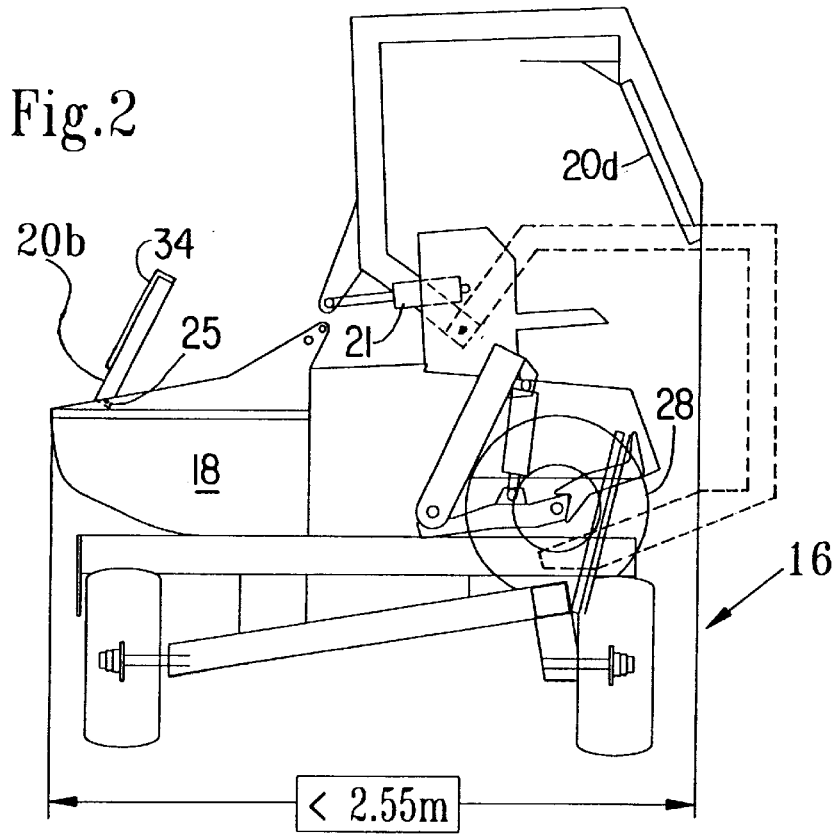
FIG. 2 is an end view showing the mower-conditioner mounted on a trailer for endwise transport, with the side conveyor being shown in solid lines in a raised, transport position, and in broken lines in a lowered working position.

Referring now to FIG. 1, there is shown a towed agricultural implement 10 having a superstructure 12 mounted for transport on a wheeled chassis 14. The implement 10 is shown as a mower-conditioner that can be hauled for transport on the road and for operation in the field by an agricultural tractor, which is not shown. The implement 10 could be embodied as a mower, tilling machine, hay rake, or the like. The implement 10 is shown, as is common nowadays, such that it features a width that exceeds the maximum dimensions permitted for road transport. Legally, a width of 3 meters is allowed when the implement is drawn on its own wheels behind the tractor, and 2.55 meters when hauled endwise or longitudinally on a trailer 16 (FIG. 2). Hereafter the term "width" is used for the dimension of the implement 10 from left to right in FIG. 1, while "depth" means the dimension of the implement 10 from left to right in FIG. 2 or from top to bottom in FIG. 1. The width of modern mower-conditioners may reach 4.5 m, for example. Superstructure 12 includes a functional unit 18 and add-on components, namely lateral guards 20a, front panel 20b and hood 20c.

In the preferred embodiment, functional component 18 represents the assembly of a reciprocating cutter bar (not shown) and a crop conditioning component conceived as, e.g., an overshot rotor conveyor. Functional unit 18 generally represents the essential functional elements of the implement 10 which cannot be easily disassembled into its individual parts within a short time. Functional unit 18 is characterized in that its width and/or depth remain within the permitted transport dimensions, so that the implement 10 can be at least transported either in the direction according to FIG. 1 or according to FIG. 2. Certain implements 10 may be transported in either orientation.

Add-on components 20a–20c are parts that play a subordinate role while they are interacting with the functional unit 18, are light and shaped in a simple manner, and are easily movable or detachable. Consequently, the lateral guards 20a, the top front panel 20b for pushing down the mown matter, and part of the rear hood 20c belong to the components. Moreover, other parts could be considered, e.g., a side conveyor 20d for mowed matter, shown in an elevated transport mode in FIG. 2 to which it has been moved by a regulating mechanism, here shown as including an extensible and retractable hydraulic cylinder 21. Other implements may feature guards, linkage or the like.

Between functional unit 18 and components 20a–20c, imaginary lines or interfaces are provided, of which lateral interfaces are each marked with designation number 22a, a frontal interface with 22b and a rear one with 22c. Each interface 22a–22c is shown as a broken line, which may, e.g., represent an articulated axis of respective hinge structures 23, in the case of numerals 22a; an articulated axis of a hinge structure 25, in the case of numeral 22b; and an articulated axis of a hinge structure 27, in the case of numeral 22c. Depending on the nature and position of the add-on components, an interface may be also located nearer the center of the functional unit 18.

The various interfaces 22a–22c permit disassembly or adjustment of the add-on components, which are located outside of the interfaces, in relation to the functional unit 18, which is located inside of the interfaces. Thus, both attachments 20a can be pivoted around lateral interfaces 22a and/or frontal wall 20b and/or rearward hood 20c may be flapped up or down, in this way reducing width or depth respectively of the implement 10.

The transport device 14 in this embodiment includes a chassis 24 and a hitch 26. The chassis 24, present only in the preferred embodiment, enables the implement 10 to be hauled on its own wheels 28 behind the agricultural tractor, the connection being made by the hitch 26.

Hitch 26 is attached for pivoting horizontally to a location on the chassis 24 which is roughly in the middle, i.e., halfway along its width, in a bearing 30. In the preferred embodiment, the hitch 26 features a pivoting angle wide enough to facilitate transport according to both FIGS. 1 and 2. In other embodiments, it suffices for the hitch 26 to facilitate transport according to FIG. 1 or FIG. 2.

Figure 3:
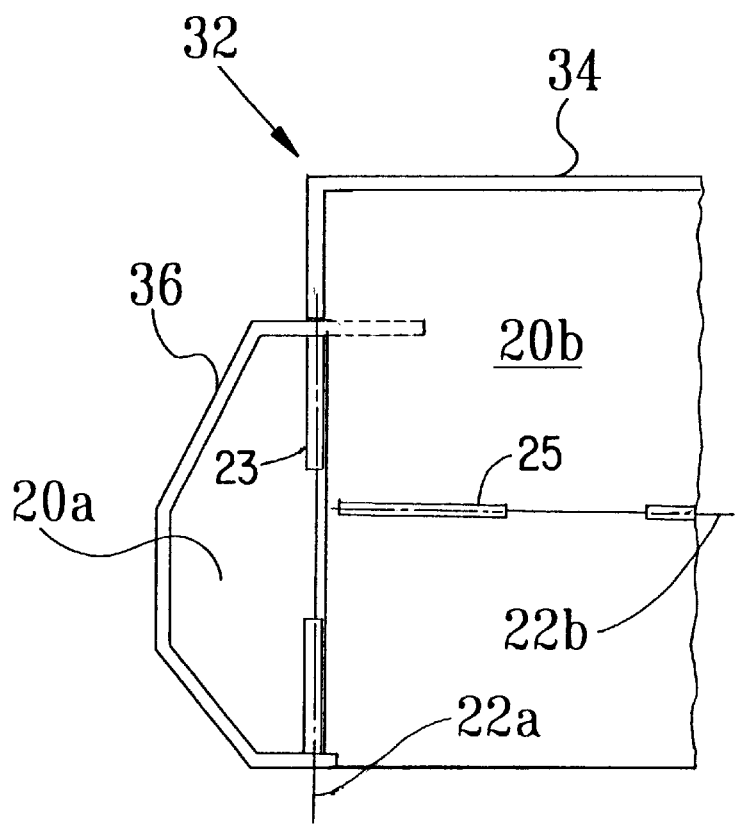
FIG. 3 is a top plan view of the front left-hand corner of the implement shown in FIG. 1, with a panel extending in accordance with a first embodiment of the invention.
Figure 4:
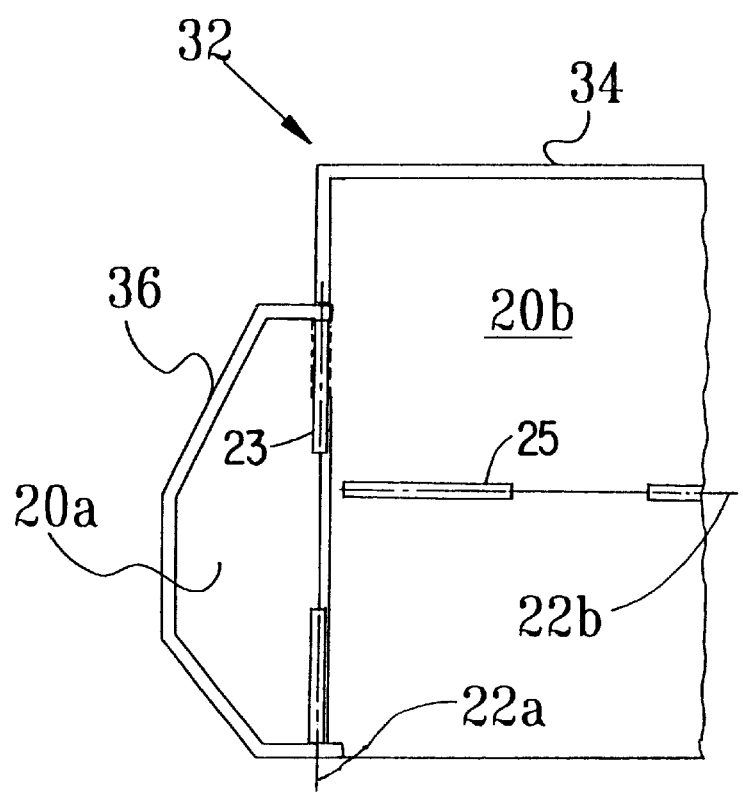
FIG. 4 is a view similar to that of FIG. 3 but showing a panel extending in accordance with a second embodiment of the invention.

In the case of the preferred embodiment of the implement 10 as a mower-conditioner, a vertical panel 32, subdivided into frontal section 34 and lateral section 36 is provisioned in the area of the attachments 20a and 20b, as shown in FIGS. 3 and 4.

Panel 32 serves the purpose of screening off the frontal working area of the group of functional components 18, so that stones and twigs propelled by the tools, or even tool segments, are deflected. This panel 32, therefore, must be closed in the area of the interfaces 22, and if necessary, feature interfaces of its own allowing the movement of the attachments 20a–20c in relation to the group of functional components 18. In the preferred embodiment, panel 32 has the shape of a plastic apron made of highly resistant flexible material that hangs down vertically and is attached to solid and stable components 20a–20c. In a manner not shown, the plastic apron is fixed to a bar, a frame or the like.

Embodiments, according to FIGS. 3 and 4, differ with regard to the manner in which frontal section 34 and lateral section 36 abut each other. In the embodiment according to FIG. 3, lateral section 36, which extends around several edges essentially from back to front, eventually ends running parallel to the main extension of the attachment 20b and frontal section 34, partly overlapping with the latter. Consequently, lateral section 36 ends below attachment 20b of the frontal horizontal panel. There, both sections 34 and 36 are attached at a 90° angle. In the embodiment according to FIG. 4, lateral section 36 of lateral attachment 20a only covers the latter's open periphery and ends at the frontal section 34. The frontal section 34 extends into the depth across the frontal edge of the lateral section 36, overlapping it by approximately one-fifth. In this case, the end portion of lateral section 36 rests vertically on the passing-by end portion of frontal section 34.

Both embodiment forms make possible pivoting of attachments 20a and 20b around respective interfaces 22a and 22b, and the existence of a closed panel 32 during the operation.

Having described the preferred embodiment, it will become apparent that various modifications can be made without departing from the scope of the invention as defined in the accompanying claims.

What is claimed is:

1. In an agricultural implement including a chassis supported on a pair of transversely spaced ground wheels for traversing the ground and a crop harvesting arrangement mounted for being carried by the chassis for transport in longitudinal and transverse positions relative to a direction of travel during operation, the improvement comprising: said crop harvesting arrangement including a central main body and a plurality of peripheral components including an elongate, transversely extending, front peripheral component and opposite side components; said front peripheral component having a length substantially equal to a distance between outer surfaces of said pair of transversely spaced ground wheels and defining a transverse interface with an upper front location of said central main body, and being mounted to said central main body at said transverse interface for pivoting about a horizontal transverse axis between a lowered, operating position wherein said front peripheral component projects forward of said main body, and a raised, transport position, wherein said front peripheral body is located entirely behind a forward end of said main body; said opposite side components respectively defining fore-and-aft extending opposite side interfaces with upper opposite side locations of said central main body, and being respectively mounted to opposite sides of said main body for pivoting at said opposite side interfaces for pivoting about respective first and second horizontal, fore-and-aft extending axes between a lowered working position wherein a distance between respective outermost surfaces of said opposite side components is greater than said distance between outer surfaces of said pair of ground wheels, and a raised transport position, wherein said opposite side components are located from each other by a distance within said distance between said pair of ground wheels; said distance between outer surfaces of said pair of ground wheels being located within the confines of, or matching maximum legally permitted dimensions for the transport of said implement on public roads when said peripheral components are in said respective transport positions.

2. The agricultural implement as defined in claim 1 wherein said plurality of peripheral components include a rear peripheral component defining a rear horizontal transverse interface with an upper rear location of said main body and being coupled to said upper rear location of said main body to define a rear horizontal transverse pivot axis at said rear horizontal transverse interface for movement about said rear horizontal pivot axis between a lowered working position extending rearward of said main body, wherein a rearmost working position surface is spaced from a foremost surface of said main body by a distance greater than a maximum legally permitted dimension for endwise transport of said implement on a public road, and a raised transport position wherein a rearmost transport position surface is spaced from said foremost surface of said main body by a distance no greater than said maximum legally permitted dimension; and a regulating mechanism being coupled between said main body and said rear peripheral component for pivoting the latter between said working and transport positions.

3. The agricultural implement as defined in claim 1 wherein said front and opposite side peripheral components include a vertical panel defined by a plurality of separate panel sections respectively mounted on said front and opposite side peripheral components.

4. The agricultural implement as defined in claim 3 wherein said respective panel sections mounted to said opposite side peripheral components overlap said panel section mounted to said front peripheral component.

5. The agricultural implement as defined in claim 3 wherein at least one of said plurality of panel sections overlaps another of said plurality of panel sections along one of said transverse front or opposite side interfaces.

6. The agricultural implement as defined in claim 1 wherein said implement includes a hitch attached to said chassis for pivoting horizontally from a first position, wherein in it extends in the longitudinal direction of the implement, into a second position wherein it extends transverse to the longitudinal direction.

7. The agricultural implement as defined in claim 1 wherein extreme lateral edges respectively of said pair of wheels are essentially co-planar with respective ones of said opposite side interfaces.

* * * * *